Patented July 8, 1952

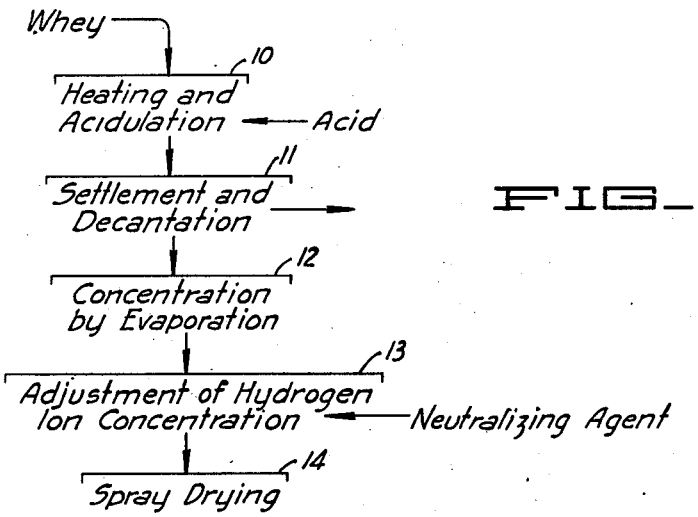
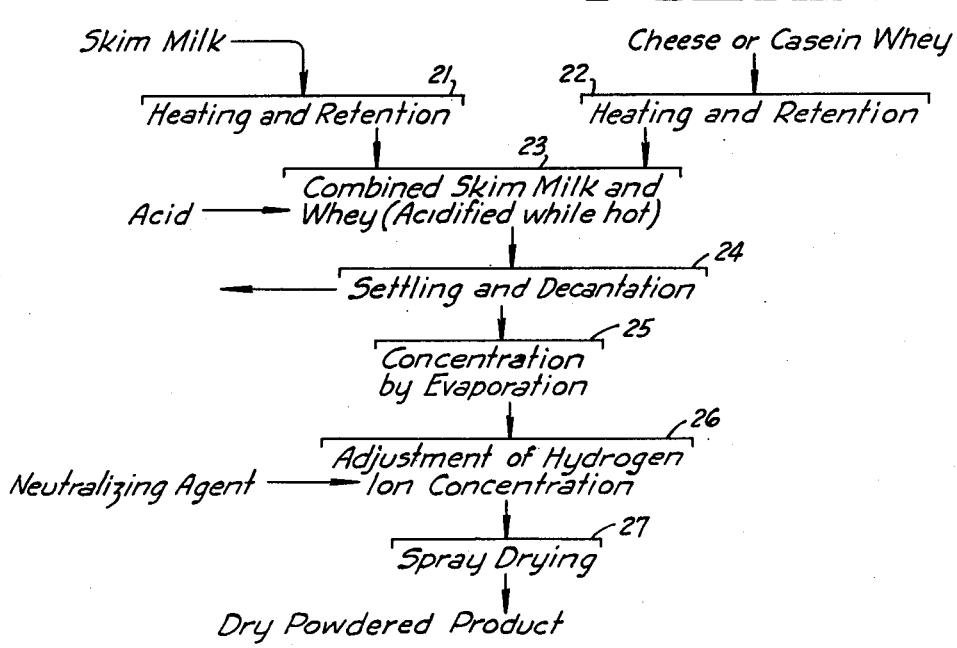

2,602,746

UNITED STATES PATENT OFFICE 2,602,746

MILK PRODUCT METHOD OF MANUFACTURE

Reginald E. Meade, Appleton, Wis., assignor to Western Condensing Company, San Francisco, Calif., a corporation of California Application July 19, 1949, Serial No. 105,519

4 Claims. (Cl. 99—56)

This invention relates generally to dry powdered milk products or concentrates such as are suitable for use in bread making, and to processes for manufacture of the same.

It has become common practice in the baking industry to use skim milk as an ingredient in the preparation of bread dough. Generally the milk is added in dry powdered form, together with wheat flour and other dough ingredients, and sufficient water is added to produce a dough of proper plasticity.

Various properties of skim milk powder affect its suitability for use in the bread dough. Aside from such properties as affect the bread with respect to its palatability, flavor, crust (color and tenderness), texture, loaf volume and keeping qualities, it is important that the added solids be capable of absorbing a substantial and predetermined amount of water in forming a dough mix of desired consistency. A good quality of skim milk powder, such as has been available on the market, and produced by processes involving heat treatment, vacuum evaporation and spray drying, affords a water absorption of substantially 100%. In other words, in preparing standard dough mixes used in bread making, when such skim milk powder is added to the mix an additional amount of water can be added to an extent equal by weight to the weight of the skim milk solids, without detrimentally affecting the plasticity of the dough. Because of the importance of water absorption efforts have been made in the past to increase the ability of such material to absorb water, but without success.

It is a general object of the present invention to provide a powdered milk product having relatively good water absorption, and which is particularly well adapted for use in bread making.

Another object of the invention is to provide a novel process for the manufacture of my special powdered milk product, whereby milk proteins, including particularly lactalbumin, are treated in a particular way to provide high water absorption, and whereby the amount of lactalbumin present in the final product, in proportion to the other milk solids, is substantially increased.

Additional objects of the invention will appear from the following description in which the preferred embodiment has been set forth in detail in conjunction with the accompanying drawing.

Referring to the drawing—

Figure 1 is a simple flow sheet illustrating one embodiment of the invention.

Figure 2 is another flow sheet illustrating another embodiment of the invention in which both skim milk and whey are used as raw materials.

The raw material used in carrying out the present process is a liquid lacteal material containing substantial amounts of milk proteins, including lactalbumin. Both commercial skim milk and whey (including whey obtained from the manufacture of casein and whey obtained as a by-product in the manufacture of cheese) contain substantial amounts of lactalbumin, and can be used as will be presently explained. A substantial content of lactalbumin is essential because I have discovered that in its absence, water absorption is relatively poor and the material is not suitable for bread making.

The present process involves the special conditioning of milk proteins while the lacteal material is in liquid form, and prior to conversion of the material to a dry powder, including particularly the conditioning of all or a substantial part of the lactalbumin present. In addition a part of the non-coagulable and dissolved solids of the initial lacteal material is removed to provide a final product having a relatively high percentage of coagulable protein. The special conditioning includes coagulation of proteins (including lactalbumin) by chemical action and heat treatment.

The flow sheet of Figure 1 illustrates my process as applied to whey as a raw material. Whey is shown being supplied to the heating and acidulating operation 10, which serves the purpose of coagulating and precipitating proteins, including the lactalbumin present. Any suitable type of heating equipment can be used for this purpose, such as will rapidly raise the temperature without localized heating, and in practice good results are secured by heating to a temperature of the order of 185 to 280° F. The material is held at this elevated temperature for a prolonged period of time ranging inversely with increase in temperature, such as from 30 to 2.5 minutes. For example at temperatures of the order of 185 to 200° F., the time period can be of the order of 30 minutes, for 240° F., 4 minutes, and for 280° F., 2.5 minutes. Various acids can be used to lower the hydrogen ion concentration to the isoelectric point of the protein, and good results have been secured by using the more common inorganic acids, particularly sulphuric acid, which may be supplied in diluted form. Acidulation may be prior to, during or immediately following the heating operation, without material difference in results. When the higher temperatures are employed, i. e. above 212° F., it is desirable for convenience to lower the temperature to a value of say from 185 to 210° F. before acidulation. Hydrochloric can be used in place of sulphuric, but it increases the salt (NaCl) content and therefore requires an adjustment in the amount of salt when preparing a dough mix. In practice I acidulate the material to provide a hydrogen ion concentration of the order of pH 4.0 to 5.6.

Following operation 10 for the coagulation and precipitation of whey proteins, the material is subjected to settlement at 11 for permitting the flocculent coagulated proteins to settle to the bottom of the retention vessel. A substantial part of the supernatant liquid is then removed by decantation. The amount of liquid withdrawn at this time is dependent upon the type of product which is desired. Thus of the total liquid content of the original whey it is desirable to remove at least about 33% of the same by decantation. The part thus removed is discarded and contains a considerable portion of the dissolved solids of the milk, including lactose.

Following settlement and decantation the material is shown being concentrated by evaporation at 12. This can conveniently be carried out by the use of a conventional vacuum evaporator.

After concentration the material is shown being treated with a neutralizing agent at 13 for adjustment of the hydrogen ion concentration, to thereby promote redispersion of the coagulated proteins. Suitable reagents such as sodium hydroxide, lime, soda ash or sodium sesqui carbonate can be used for this purpose. Assuming that lime is being used, it may be introduced in the form of a milk of lime (i. e. calcium hydroxide dispersed in water) in sufficient amount to adjust the hydrogen ion concentration to about pH 6.0 to 9.0, a preferred range being from pH 6.5 to 6.75.

The material is then subjected to the spray drying operation 14, which can be carried out by the use of conventional spray drying equipment in which the concentrate is atomized in contact with a drying gas. Although spray drying is preferable to develop higher water absorbing properties, roller drying can be used if desired.

As is understood by persons familiar with spray drying, the preceding concentration by evaporation can be omitted if desired. Also such concentration can be carried out after instead of before operation 13.

The product obtained from the process outlined in Figure 1 has properties which render it particularly well suited for use in bread making. It posesses all of the good properties of present day high quality skim milk powder, but it differs from conventional products in that it has relatively high water absorptivity. Products made according to the present process have shown water absorptivity of the order of from 60 to 90% (average about 75%) in contrast with about 33% for whey treated and dried by conventional methods. In conventional bread making where the amount of powdered skim milk added to the dough mix amounts to 6% of the weight of the flour in the mix, the use of my product in place of conventional powdered products permits use of additional water in the mix, while retaining the desired optimum plasticity for the dough.

Removal of supernatant liquid after coagulation and precipitation of the proteins serves to decrease the percentage of certain component ingredients in the final product, particularly solids such as lactose and mineral salts which are in solution at the time of decantation. Spray drying of the conditioned lactalbumin together with other milk solids, produces a water absorptivity for the final product which is considerably better than can be obtained for lactalbumin spray dried in the absence of other milk solids.

Lactalbumin appears to play an important part in attaining high absorptivity, although absorptivity appears to be in part due to other milk proteins present, including casein. Because of coagulation and precipitation of the milk proteins followed by dispersion by adjustment of the hydrogen ion concentration, the proteins are in a denatured form, and it appears that such denaturing or conditioning of the proteins contributes to high absorptivity in the final product.

It is possible to alter the procedure of Figure 1 in various respects. Thus only part of the whey may be subjected to settlement and decantation, and the material remaining after decantation then remixed with the rest of the whey for further treatment. Also it is possible to produce various blended products, as by blending the material from operation 11 with a separately introduced skim milk, or blending the concentrate from 13 with skim milk concentrate.

The flow sheet of Figure 2 illustrates a process in which both skim milk and whey are used as sources of material. Thus separate amounts of skim milk and whey are subjected to the heating and retention operations 21 and 22, which can be at an elevated temperature of the order of from 185 to 200° F., for a period of the order of 30 minutes. Here again as in Figure 1 higher treatment temperatures can be used for shorter periods of time. The two heat treated materials are combined at 23, and the mixture acidulated by addition of a suitable acid, such as dilute sulphuric acid, for coagulating and precipitating the proteins present. The material is then subjected to settlement and decantation at 24, where a substantial part of the supernatant liquid is removed. The remaining material is then subjected to concentration by evaporation at 25, after which a suitable neutralizing agent, such as milk of lime, is added to the material in operation 26 to adjust the hydrogen ion concentration to a value of the order of from pH 6.0 to 9.0. The material is then subjected to spray drying at 27 to produce a final dry powdered product.

By following the procedure outlined in Figure 2 it is possible to produce a dry powdered product suitable for bread making, and which will provide a moisture absorptivity of the order of from 150 to 200. The procedure of Figure 2 is desirable where a supply of inexpensive whey is available, and where it is necessary to provide a moisture absorptivity which is greater than can be obtained by the use of liquid whey by itself.

It is possible to employ variations of the above described procedures to produce the desired product. For example I can employ the process of Figure 1 to produce a concentrate from whey, and then mix the same with a treated skim milk. The treated skim milk can be prepared by acidulation, heat treatment and adjustment of the hydrogen ion concentration in the same manner as the steps 10 and 13 of Figure 1. A blend of the two materials, that is of the treated skim milk (with or without concentration) and the treated concentrate from whey, can then be spray dried to form a final powdered material. It is also possible to separately spray dry the concentrate obtained from whey according to Figure 1, and a skim milk treated as described above, thus producing two powdered products, which are then intermixed together, to form a final blended product.

Another possible variation of the process is to blend the material remaining after decantation 11 (Figure 1) with a quantity of untreated skim milk, after which the blend is heat treated, acidified, concentrated by vacuum evaporation, neutralized, and spray dried, all as previously described.

In the foregoing embodiments of the invention the whey is heat treated in conjunction with acidulation, and its hydrogen ion concentration is adjusted by the use of a neutralizing agent, after settlement and decantation. It has been found possible to secure the desired coagulated effect by employing acidulation followed by neutralization with lime, prior to the heat treatment. Thus diluted sulphuric acid can be introduced into the whey to provide a hydrogen ion concentration of the order of pH 4.0 to 5.6, after which milk of lime is introduced to provide a hydrogen ion concentration of the order of from pH 6.0 to 9.0. Thus as a typical example good results can be secured by acidulation to pH 4.5, followed by neutralization with lime to pH 6.5. This material can then be heat treated in the manner previously described, whereby lactalbumin and other milk protein present is coagulated and precipitated. Following such heat treatment the material can be subjected to decantation, and the material remaining after decantation spray dried, either with or without previous concentration by evaporation.

In the above embodiment of the process it appears that the presence of calcium sulphate, formed by reaction between the sulphuric acid and the lime, during heat treatment, causes an effect upon the lactalbumin and other protein present similar to the effect in the previously described embodiments, where the acidulated material is heat treated before the lime or other neutralizer is added. Thus as a further modification of the process a mineral salt such as calcium sulphate is added to a neutral whey in an amount substantially equivalent to the salt formed when the acid and neutralizer are added separately. With application of the heat treatment the protein is coagulated or denatured in substantially the same manner, although it appears that the water absorptivity of the resulting powder is not as high as when the acid and neutralizer are added successively.

The same treatment just described above can also be applied to skim milk being prepared for blending with the treated and decanted whey.

Examples of actual practice are as follows:

Example I

Fresh cheese whey was heated to a temperature of 200° F. and held at this temperature for a period of 30 minutes. A dilute (20%) solution of sulphuric acid was added to adjust the hydrogen ion concentration to pH 4.65. The coagulated protein precipitate thereby formed was permitted to settle and supernatant liquid was removed by decantation to the extent of leaving 50% of the original volume of whey. The residual material was then neutralized by the addition of milk of lime (10% calcium hydroxide dispersed in water) to adjust the hydrogen ion concentration to pH 6.5, concentrated by vacuum evaporation and then converted to a dry powder by spray drying.

The product obtained by the foregoing example had a moisture absorption of about 75%. When incorporated in a standard bread dough to the extent of 6% of the wheat flour employed, good quality loaves were obtained, comparable to the best quality loaves obtained from the use of conventional spray dried skim milk. The higher moisture absorption of the powder permitted an increase in the amount of water to be used in the dough mix, without loss of plasticity, and with production of bread loaves of the same quality as would be obtained by use of conventional dried whey with a lesser amount of water.

Example II 240 lbs. of raw skim milk was heated to 200° F. for a period of 30 minutes. 600 lbs. of sweet Cheddar cheese whey was similarly heated to a temperature of 200° F. for a period of 30 minutes. The two quantities were combined while held at the temperature of 200° F., and then acidulated by addition of dilute (20%) sulphuric acid, to a hydrogen ion concentration of pH 4.65. As a result proteins including lactalbumin were coagulated and precipitated, and the precipitate permitted to settle. 600 lbs. of supernatant liquid was then decanted off and the remaining material was concentrated by vacuum evaporation and spray dried to form a final powdered product. The powder analyzed as follows:

| | |
|---|---|
| Moisture _____per cent__ | 0.65 |
| Acid _____do____ | 1.2 |
| Lactose _____do____ | 46.4 |
| Protein _____do____ | 39.4 |
| Ash _____do____ | 9.21 |
| pH _____ | 6.8 |

The product obtained from the foregoing example had a moisture absorption of 166%, and when incorporated in a standard bread dough to the extent of 6% of the wheat flour, it gave a loaf of good quality and loaf volume comparable to that obtained by conventional spray dried skim milk.

Example III

A quantity of skim milk was heated to 200° F. and held at this temperature for 30 minutes. This milk was then concentrated to 20% solids content by vacuum evaporation. A quantity of fresh Cheddar cheese whey was heated to 200° F., dilute (20%) sulphuric acid added to adjust the hydrogen ion concentration to pH 4.5, and the material held at 200° F., for a period of 30 minutes. The coagulated protein precipitate settled during the period of retention. Supernatant liquid was removed by decantation, and the residual precipitate was twice washed with fresh water followed by settlement and decantation. The washed concentrated slurry was then neutralized by addition of dilute (10%) sodium hydroxide solution to a hydrogen ion concentration of pH 6.5. The heat treated skim milk concentrate and the lactalbumin concentrate were then combined in two different ratios, to provide two different products having different contents of lactalbumin. One product contained about one part of lactalbumin derived from the whey, to five parts of solids derived from the skim milk. The second product contained one part of lactalbumin obtained from the whey, and eleven parts of milk solids obtained from the skim milk.

These products had water absorption of 200% and 166% respectively, and when used in bread making gave good results with respect to the characteristics of the loaf obtained.

Example IV 600 lbs. of whey was heated to 200° F. for a period of 30 minutes. 240 lbs. of skim milk was likewise heated to 200° F. for a period of 30 minutes. The heat treated whey and skim milk portions were then mixed and sufficient dilute sulphuric acid added to adjust the hydrogen ion concentration to pH 4.65. The mixture was permitted to stand to settle the precipitate, and then a quantity of supernatant liquid decanted off until the remaining volume equaled the initial volume of the skim milk. The material was then adjusted to a hydrogen ion concentration of pH 7.0 by addition of a dilute solution of sodium hydroxide, concentrated by vacuum evaporation, and spray dried.

The material produced as described above analyzed as follows:

| | |
|---|---|
| Moisture _____ per cent__ | 1.7 |
| Acid _____ do____ | 1.3 |
| Lactose _____ do____ | 47.7 |
| Protein _____ do____ | 37.1 |
| Ash _____ do____ | 10.3 |
| pH _____ | 6.9 |

The product obtained from the foregoing example had a water absorption of 166.6% and was similar in characteristics to the product obtained from Example II.

Example V 125 lbs. of skim milk was heated to 200° F. for a period of 30 minutes. 250 lbs. of whey was prepared by heating skim milk to 105° F., and then adding sulphuric acid to adjust the hydrogen ion concentration to pH 4.65 and thereby precipitate casein. The whey decanted from the precipitated material was added to the heat treated skim milk and the mixture, while at a temperature of 200° F., was acidified by addition of dilute sulphuric acid to adjust the hydrogen ion concentration to pH 4.65. It was then cooled and the precipitated protein permitted to settle. Sufficient supernatant liquid was removed by decantation to leave 125 lbs. of material. This material was then neutralized, by the addition of dilute sodium hydroxide, to a hydrogen ion concentration of pH 6.68. After neutralizing the material was spray dried to form a powdered product.

The powdered product obtained from the foregoing example had all of the desirable properties of the product obtained according to Example II, and had a water absorption of 166%.

Example VI 2500 lbs. of whey was heated to 190° F., and then mixed with 500 lbs. of skim milk, which had likewise been heated to 190° F. The mixture was held at this temperature for a period of 30 minutes, and the hydrogen ion concentration adjusted to pH 4.8 by addition of dilute sulphuric acid. The coagulated protein was allowed to settle, and sufficient supernatant liquid decanted off to leave a volume of material equal to the original volume of skim milk. The hydrogen ion concentration of this material was adjusted to pH 6.28 by addition of sodium hydroxide solution, after which the material was concentrated by vacuum evaporation and spray dried.

The product produced by the foregoing example had all of the desirable properties of the product obtained from Example II, and had a water absorption of 200%.

Although the preferred form of the product is a dry powder, it is possible to use the treated liquid in concentrated form (without spray drying) for the preparation of dough mixes as previously described, provided the water content of the mix is adjusted accordingly. It is desirable however that such concentrates have at least 50% solids.

As shown by the foregoing examples my product is a decided improvement over prior skim milk products, particularly with respect to its high water absorptivity. My process is relatively simple to apply commercially for low cost quantity production to supply the needs of the baking industry.

I claim:

1. In a process for the manufacture of a dry powdered product having high water absorptivity when used in bread dough, the steps of coagulating milk protein of a lacteal material containing the proteins of whey, such coagulation being carried out by increasing the mineral content of the lacteal material and by heat treatment to a temperature of the order of from 185 to 280° F., subjecting the material to settlement and decantation, removing a supernatant liquid relatively free of coagulated protein to reduce the original volume of the material by not more than about 50%, and then converting the remaining material to a dry powdered product.

2. In a process for the manufacture of a dry powdered product having high water absorptivity when used in bread dough, the steps of treating liquid whey to coagulate its lactalbumin, said treatment being carried out by increasing the mineral content of the whey and by heating the whey to a temperature of the order of from 185 to 280° F., subjecting the whey to settlement and decantation whereby a liquid fraction is removed to reduce the original volume of the liquid whey by not more than about 50% and then drying the remaining material to form a powdered product.

3. In a process for the manufacture of a dry powdered product having high water absorptivity when used in bread dough, the product being made from a lacteal material containing the proteins of whey, the steps of coagulating milk proteins of the lacteal material by heating the material to a temperature of the order of from 185 to 280° F., for a period of time from 30 to 2.5 minutes and also by acidulating the material to a hydrogen ion concentration of the order of pH 4.0 to 5.6, and by neutralizing the acidity to provide a pH value of from 6.0 to 9.0, subjecting the material to settlement and decantation to remove a supernatant liquid from the remaining material to reduce the original volume of the material by not more than about 50%, the liquid being substantially free of coagulated protein, and then converting the remaining material to dry powdered form.

4. In a process for the manufacture of a dry product having high water absorptivity when used in bread dough, heating quantities of skim milk and whey to a temperature of the order of from 185 to 280° F. for a period of time ranging inversely from 30 to 2.5 minutes and increasing the mineral content of the material to denature protein, subjecting the material to settlement and decantation to remove a supernatant liquid to reduce the original volume of the skim milk and whey, neutralizing the remaining material to a hydrogen ion concentration of the order of from pH 6.0 to 9.0, and then converting the material to dry powdered form.

REGINALD E. MEADE.

REFERENCES CITED

The following references are of record in the file of this patent:

UNITED STATES PATENTS

| Number | Name | Date |
| --- | --- | --- |
| 442,593 | Rehnstrom | Dec. 9, 1890 |
| 482,897 | Frederiksen | Sept. 20, 1892 |
| 664,318 | Hall | Dec. 18, 1900 |
| 1,557,181 | Messmer | Oct. 13, 1925 |
| 1,870,270 | Washburn | Aug. 9, 1932 |
| 2,023,014 | Flanigan et al. | Dec. 3, 1935 |
| 2,181,146 | Peebles et al. | Nov. 28, 1939 |

OTHER REFERENCES

Rogers, Associates of, "Fundamentals of Dairy Science," published 1928 by The Chemical Catalog Co. Inc., N. Y. city, pages 46, 53, 51.

Hunziker, O. F., "Condensed Milk and Milk Powder, published 1946 by the author, La Grange, Illinois, 6th edition, pages 17, 19, 240.